June 22, 1943.    R. G. LETOURNEAU    2,322,371
POWER CONTROL UNIT
Filed Aug. 16, 1941
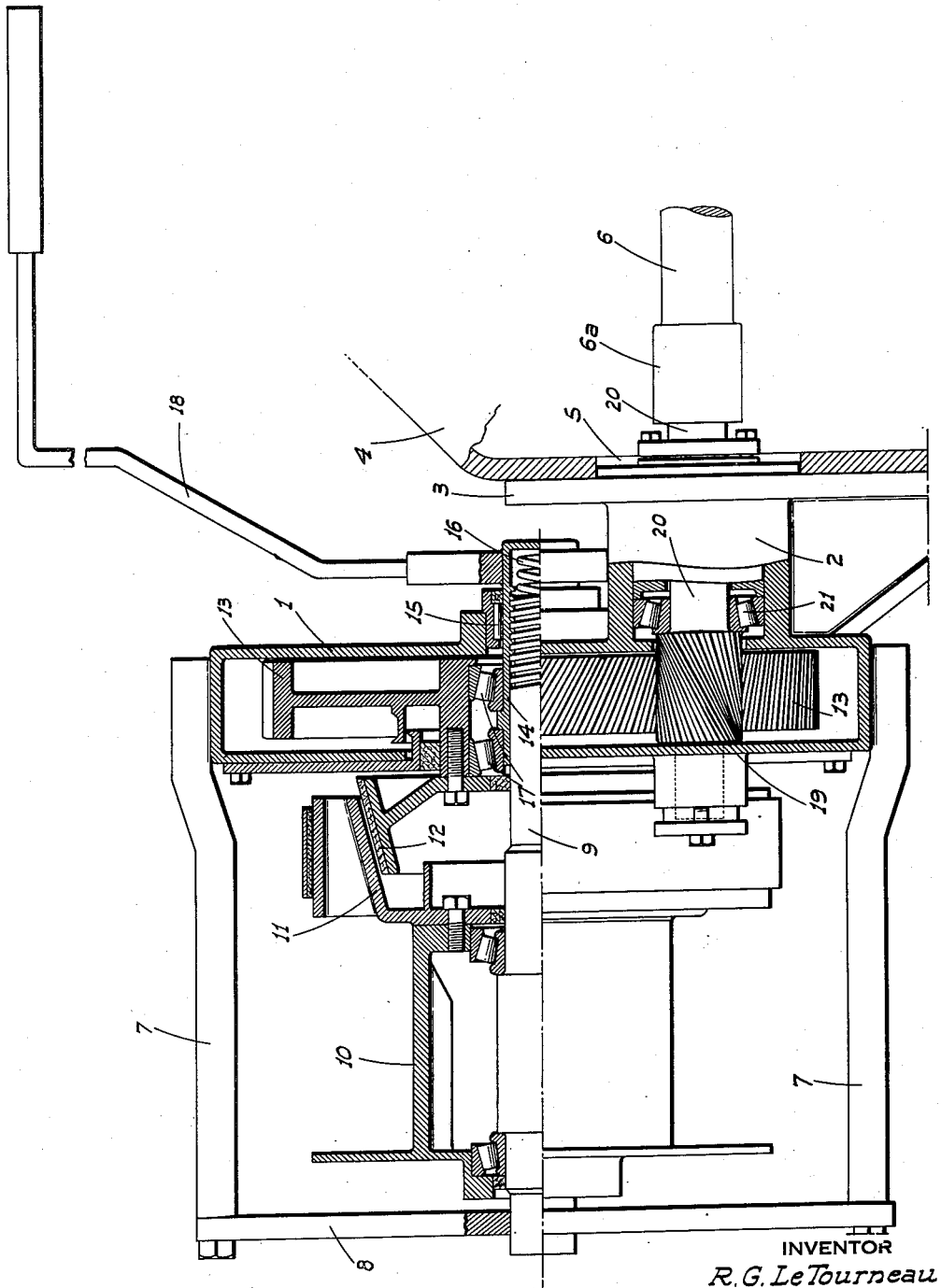
INVENTOR
R. G. LeTourneau
BY
Webster & Webster
ATTYS.

Patented June 22, 1943

2,322,371

UNITED STATES PATENT OFFICE 2,322,371

POWER CONTROL UNIT

Robert G. Letourneau, Peoria, Ill., assignor to R. G. Letourneau, Inc., a corporation of California Application August 16, 1941, Serial No. 407,213

8 Claims. (Cl. 192—32)

This invention relates to power control units, or power winches, and particularly to one of that type adapted to be mounted on the rear end of a tractor and to be driven from the power take-off shaft thereof, to control the operatiton of an implement connected to the tractor. The power unit of this type is shown in my Patent No. 1,912,645, dated June 3, 1933, the structure of this application representing an improvement of the structure of the patent.

The unit includes a constantly driven normally disengaged clutch element adapted to be manually engaged when desired with a cooperating clutch element on the cable drum of the unit, and the principal object of the present invention is to arrange the driving and control mechanism for said normally disengaged clutch element, so that the engagement of said element is facilitated, and at the same time the greater the load on the cable and drum, the greater is the holding power of the clutch. Slipping of the clutch under any load condition is therefore extremely unlikely, and it is unnecessary for the operator to exert severe physical pressure in holding the clutch engaged.

These objects I accomplish by means of such structure and relative arrangement of parts as will fully appear by a perusal of the following specification and claims.

The figure on the drawing is a longitudinal view of the power control unit, taken one-half in section through the main gear and drive and half substantially in section through the driving pinion.

Referring now more particularly to the characters of reference on the drawing, the main features of construction and arrangement of the unit are substantially the same as in the above mentioned patent. Such features as are essential to an understanding of this invention include a gear housing 1 having a forward tubular extension 2, on the front end of which is a vertical flange 3 abutting and secured against the rear end of the tractor transmission housing 4 over the opening 5 which exposes the power take-off shaft 6 of the tractor.

Rigid bars 7 project rearwardly from the housing 1 at top and bottom and are connected at the rear end on a back plate 8, the plate, bars and housing forming the rigid framework of the unit.

Projecting forwardly from and clamped against rotation in the plate 8 is a shaft 9, parallel to the tractor shaft 6 but laterally offset from and above said shaft and the tubular extension 2, said shaft projecting through the housing 1. Turnable on the shaft 9 and held against axial displacement thereon is a cable drum 10, on which is secured a female cone clutch element 11 facing toward the rear end of the housing. A cooperating clutch element 12 is mounted in fixed connection with a gear 13 within the housing 1 in concentric relation to the shaft 9.

A sleeve 14 is threaded on the forward end of the shaft 9 and projects from the front end of the housing, being journaled on a roller bearing 15 supported in the front wall of said housing. A compression spring 16 is disposed in the sleeve between the forward closed end thereof and the adjacent end of the shaft 9. Roller bearings 17 are disposed between the sleeve and the hub of the gear 13, thus turnably supporting the latter; said bearings being arranged to prevent axial displacement of the gear along the sleeve in either direction.

The gear, clutch element 12, and the sleeve thus move as a unit along the shaft, such movement of course occurring when the sleeve is turned relative to the shaft, and such turning being controlled by the operator on the tractor by means of a lever 18 secured on and upstanding from the sleeve ahead of the bearing 15.

The gear is helically cut as shown, and is engaged by a helical pinion 19 fixed on a shaft 20 journaled in the housing 1 and extension 2 and held against axial displacement by reamer bearings 21. The shaft 20 alines with the take-off shaft 6 and projects forwardly of the flange 3, said shaft 6 being provided with a driving socket 6a into which the shaft 20 removably projects.

The angle of cut of the pinion teeth, and those of the gear teeth relative to the direction of driving of the pinion, is such that a rearward pressure is exerted on the gear 13. This tends to shift the gear rearwardly and thus move the clutch element 12 into engagement with the drum clutch element 11. The actual manual movement of the sleeve 14 along the shaft and on which the gear is fixed, and which, as above stated, is controlled by movement of the lever 18, is therefore greatly facilitated. Also the greater the tangential load on the cable drum, and which is transmitted to the gear when the clutch is engaged, the greater is the pressure tending to hold the clutch engaged so that possible slipping is eliminated.

It is therefore unnecessary to exert as much pressure on the lever, either to initially engage the clutch or to hold the same engaged under load, as was previously the case.

The spring 16 constantly takes up any loose play in the threads between sleeve 14 and shaft 9.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a power unit which includes a fixed shaft, a cable drum turnable on the shaft but held against axial movement thereon, a clutch element fixed with the drum, a cooperating clutch element mounted concentric with and movable axially of the shaft, hand means to control the movement of the cooperating element along the shaft, and separate drive means for said cooperating element functioning to also exert a pressure thereon in an axial direction toward the first named clutch element.

2. In a power unit which includes a fixed shaft, a cable drum turnable on the shaft but held against axial movement thereon, a clutch element fixed with the drum, a cooperating clutch element, a gear fixed with said cooperating element, a sleeve mounted on and movable along the shaft, means turnably mounting the gear on the sleeve and holding the same against axial movement relative thereto, hand means to move the sleeve and a driving pinion engaging the gear; said gear and pinion being helically cut in such relation to direction of rotation of the pinion as to cause an axial pressure to be exerted on the gear in the direction of the first named clutch element.

3. A clutch structure comprising a gear mounted for rotary and independent axial movement, an axially immovable drive pinion in mesh with the gear, said gear and pinion being helically cut so as to cause an axial force to be exerted on the gear in one direction, manually actuated means arranged to move the gear axially, said means normally preventing axial movement of the gear by said axial force, a clutch element mounted in connection with said gear for rotation and axial movement therewith, and a cooperating axially immovable clutch element mounted adjacent said first named clutch element in position for engagement by the latter upon movement of the gear in said one direction.

4. A clutch structure comprising a gear mounted for rotary and independent axial movement, an axially immovable drive pinion in mesh with the gear, said gear and pinion being helically cut so as to cause an axial force to be exerted on the gear in one direction, manually actuated means arranged to move the gear axially, but normally preventing axial movement of the gear by said axial force, said means including a manually rotatable sleeve on which the gear is rotatably but axially immovably mounted and a fixed shaft on which the sleeve is threaded, a clutch element mounted in connection with said gear for rotation and axial movement therewith, and a cooperating axially immovable clutch element mounted adjacent said first named clutch element in position for engagement by the latter upon movement of the gear in said one direction.

5. A clutch structure comprising a gear, a sleeve on which the gear is rotatably but axially immovably mounted, a fixed shaft, the sleeve being threaded on said shaft, an axially immovable drive pinion in mesh with the gear, said gear and pinion being helically cut so as to cause an axial force to be exerted on the gear in one direction, a clutch element mounted in connection with the gear for rotation and axial movement therewith, a cooperating axially immovable clutch element mounted adjacent said first named clutch element in position for engagement by the latter upon movement of the gear in said one direction, and hand means operative to rotate the sleeve about said first shaft.

6. A clutch structure comprising a gear mounted for rotary and independent axial movement, an axially immovable drive pinion in mesh with the gear, said gear and pinion being helically cut so as to cause an axial force to be exerted on the gear in one direction, manually actuated means arranged to move the gear axially, said means normally preventing axial movement of the gear by said axial force, and a cone clutch assembly disposed adjacent and concentric to the gear, one element of said clutch assembly being mounted in connection with said gear for rotation and axial movement therewith, and the other clutch element being axially immovable and positioned for engagement by said one clutch element upon movement of the gear in said one direction.

7. In a power control unit which includes a clutch assembly, a cable drum fixed with one clutch element, said element being rotatable but axially immovable, another clutch element disposed for axial movement to and from engagement with said one clutch element, a gear mounted for rotary and independent axial movement, said gear being concentric to and fixed with said other clutch element, manually actuated means arranged to move the gear axially toward or away from said one clutch element whereby to engage or disengage the clutch assembly, said means normally preventing axial movement of the gear, and an axially immovable drive pinion in mesh with the gear; said gear and pinion being helically cut so as to cause an axial force to be exerted on the gear in the direction of said one clutch element.

8. In a power control unit which includes in axial alinement a drum, a clutch assembly and a gear, one clutch element being secured to the drum and the other clutch element being secured to the gear, the drum being axially immovable and the gear axially movable, and a drive pinion in mesh with the gear; said pinion and gear being helically cut so as to cause an axial force to be exerted on the gear in the direction of the drum, and hand means operative to control movement of the gear by said force in said direction.

ROBERT G. LETOURNEAU.